US012026281B2

(12) United States Patent
Nedelec et al.

(10) Patent No.: US 12,026,281 B2
(45) Date of Patent: Jul. 2, 2024

(54) METHOD FOR CREATING AVATARS FOR PROTECTING SENSITIVE DATA

(71) Applicant: BIG DATA SANTE, Nantes (FR)

(72) Inventors: Yohann Nedelec, Bouffere (FR);
Olivier Breillacq, Nantes (FR)

(73) Assignee: BIG DATA SANTE, Nantes (FR)

( * ) Notice: Subject to any disclaimer, the term of this patent is extended or adjusted under 35 U.S.C. 154(b) by 415 days.

(21) Appl. No.: 17/420,735

(22) PCT Filed: Jan. 3, 2020

(86) PCT No.: PCT/EP2020/050097
§ 371 (c)(1),
(2) Date: Jul. 6, 2021

(87) PCT Pub. No.: WO2020/144118
PCT Pub. Date: Jul. 16, 2020

(65) Prior Publication Data
US 2022/0067202 A1    Mar. 3, 2022

(30) Foreign Application Priority Data

Jan. 7, 2019  (FR) ....................................... 1900108

(51) Int. Cl.
*G06F 21/62*        (2013.01)
(52) U.S. Cl.
CPC ................................ *G06F 21/6254* (2013.01)

(58) Field of Classification Search
CPC .......................... G06F 21/6254; G06F 16/906
See application file for complete search history.

(56) References Cited

U.S. PATENT DOCUMENTS

| 7,475,085 B2 * | 1/2009 | Aggarwal ........... G06F 16/2465 |
| | | 707/999.009 |
| 2012/0030165 A1 | 2/2012 | Guirguis et al. |
| 2019/0156061 A1 * | 5/2019 | Chakraborty ....... H04L 63/0421 |

OTHER PUBLICATIONS

International Search Report for corresponding International Application No. PCT/EP2020/050097, dated Mar. 12, 2020. 4 pages.
(Continued)

*Primary Examiner* — Paul E Callahan
(74) *Attorney, Agent, or Firm* — Leason Ellis LLP

(57) ABSTRACT

The present invention relates to a method for creating avatars from an initial sensitive data set stored in a database of a computer system, the initial data comprising attributes relating to a plurality of individuals, the method comprising: a) choosing a number {k} of nearest neighbors to be used from all the individuals in the initial data set, b) identifying, for attributes relating to a given individual, the k nearest neighbors from among the other individuals in the data set, c) generating, for at least one attribute relating to said individual, a new attribute value from quantities which are characteristic of the attribute in the identified k nearest neighbors and weighted by a coefficient, and d) creating avatar data comprising the new attribute value(s), so as to ensure the sensitive data relating to the individual are non-identifiable.

15 Claims, 7 Drawing Sheets

(56) References Cited

OTHER PUBLICATIONS

Luisa Franconi et al, "Community Innovation Survey: comparable dissemination", Luxembourg; Dec. 31, 2009 (Dec. 31, 2009), p. 11-23. 13 pages.
Vicenç Torra et al., "Evaluating Fuzzy Clustering Algorithms for Microdata Protection", Jun. 29, 2004 (Jun. 29, 2004), Privacy in Statistical Databases; [Lecture Notes in Computer Science;;LNCS], Springer-Verlag, Berlin/Heidelberg, pp. 175-186. 12 pages.

* cited by examiner

METHOD FOR CREATING AVATARS FOR PROTECTING SENSITIVE DATA

CROSS-REFERENCE TO RELATED PATENT APPLICATIONS

This application is a U.S. National Stage Application under 35 U.S.C. § 371 of International Patent Application No. PCT/EP2020/050097, filed Jan. 3, 2020, which claims the benefit of priority of French Patent Application No. 1900108 filed Jan. 7, 2019, both of which are incorporated by reference in their entireties. The International Application was published on Jul. 16, 2020, as International Publication No. WO 2020/144118 A1.

The present invention relates to a method for creating avatars from an initial sensitive data set, comprising attributes relating to a plurality of individuals.

TECHNICAL FIELD

Protecting sensitive data, particularly personal data put online or transmitted to third parties to be used, is a crucial issue. Present solutions aimed at allowing third parties, interested in their information potential, to access sensitive data sets do so by securing at a high level the possibility of working on files without knowing the content thereof. Therefore, while not excluding the need to control data access, securing data at source through genuine anonymization is required.

Anonymization may be defined as an operation that removes all the information contained in a document or database that allows an individual to be directly or indirectly identified. There are different methods of doing this.

PRIOR ART

The method known as substitution, or pseudonymization, consists of replacing the initial personal identifier with another arbitrary identifier, or pseudonym. To guarantee the traceability and updating of the information in the database and prevent data relating to one individual from being associated with another, in the absence of a permanent identifier, this pseudonym must be unique to each person.

Accordingly, a secret correlation table may be generated which associates, once and for all, all the identifiers with the pseudonyms that have been associated therewith. The level of security of this anonymization technique is low as the operation is reversible since the identifier can be recovered from the pseudonym, and the person in possession of the table can read the database with ease.

It is also possible to use a function known as hashing, which has the particular feature compared with standard encryption algorithms of not being reversible: the initial identifier cannot be recovered simply from the pseudonym alone, even if the hash function that was used is known. However, despite being irreversible in principle, this technique can be compromised by reconstituting a correlation table by reiteration.

It is possible to enhance anonymization security by previously adding an arbitrary secret key to the initial identifiers, which key is then subjected to the hash function. Anyone wishing to reconstitute the correlation table must therefore not only test all the possible surnames and forenames, which is relatively easy, but also all the modifications to which said identifiers could be subject from unknown keys. However, the security of the device rests once again on the confidentiality of the tools used: the secret key on one hand and the hash function used on the other.

It is also possible to strengthen anonymization by double hashing with a secret key, which consists of carrying out the operation a first time and subjecting the pseudonym obtained to a second hash function with a secret key. To ensure complete confidentiality, the keys may be renewed regularly.

Suppression, masking or noise addition methods consist of degrading the initial information by suppressing particular data or alternatively by adding information that scrambles the initial data. The drawback of such methods is that the data is distorted from the outset, which renders said data less relevant for any use other than the original one. Patent application FR 3 047 586 discloses a method of adding noise to sensitive data divided into subsets, with different noise levels applied depending on the level of sensitivity determined for each subset.

In international application WO 2017/093736, data anonymization is carried out using one or more techniques that perturb the original data, such as the use of tokens, generalization, data blurring, synthetic record insertion, record suppression or reorganization. In both these applications, anonymization is carried out by successive transformations on the individual item of sensitive data.

Aggregation is a method that consists of combining a plurality of values in a single class. For example, individuals originally aged 25, 27 and 30 years will be categorized in the same 25-30 year band. The higher the level of aggregation, the lower the risk of re-identification, but at the same time, the less precise the information. The authority responsible for the database must therefore find a satisfactory balance between the robustness of the anonymization guaranteed by the level of aggregation and data precision authorized. International application WO 2018/028783 describes a method that allows all data containing sensitive information to be made anonymous, using this type of aggregation method.

Moreover, in the context of the exponential dissemination of all types of public or private data on all possible objects, sometimes referred to as "big data," information cross-checking techniques are a very effective means of breaching the anonymity of sensitive databases. Some data, which are more sensitive than others, such as data relating to state of health, family life, legal affairs or wealth, are moreover subject to particular precautions, as recommended by the French data protection agency [Commission Nationale de l'Informatique et des Libertés] (CNIL). No solution allows the entirety of the signal contained in a dataset to be preserved while eradicating all risk of identification. Nevertheless, the pitfalls that occur with anonymization techniques are many.

DISCLOSURE OF THE INVENTION

Consequently, there is a need to further improve the protection of sensitive data, by rendering said data irreversibly non-identifiable while retaining maximum data utility for the purpose of analysis.

The object of the present invention is precisely to meet this need.

SUMMARY OF THE INVENTION

The object of the present invention is therefore a method for creating avatars from an initial sensitive data set stored in a database of a computer system, said initial data comprising attributes relating to a plurality of individuals, the method comprising:
  a) choosing, for attributes relating to a given individual, a number k of nearest neighbors to be used from all the individuals in the initial data set,
  b) identifying, for that individual, the k nearest neighbors from among the other individuals in the data set,
  c) generating, for at least one attribute relating to said individual, a new attribute value from quantities which are characteristic of said attribute in the identified k nearest neighbors and weighted by a coefficient, and
  d) creating avatar data comprising the new attribute value(s), so as to ensure the sensitive data relating to the individual are non-identifiable.

The invention achieves genuine anonymization in the sense of the loss of the ability to re-identify the individuals from whom the data originated. The object of creating avatars which correspond to virtual, synthetic individuals, known as "avatarization," is to prevent any direct or indirect re-identification.

The invention is centered on individual observations (i.e. data-driven and patient-centric) and not on a broad set of individuals who resemble one another. Said invention differs from some of the known methods, which are based on sub-group observation. Said invention always uses the environment of the individual to create the avatar. It allows large volumes of data to be handled while maintaining the existing links between variables.

Unlike the known methods described below, the invention generates a new synthetic record in full: the avatar. Said invention takes a step forward not achieved by the current techniques in the sense that said invention proposes generating an item of synthesis data in full from the local environment of the original item of data. The avatar results from a local generalization of its environment. For example, in the case of medical data, the avatar of a patient is created from similar individuals, the number of which can be parameterized.

The invention helps ensure that the usefulness of the dataset is maintained, offering the possibility of carrying out the same analyses, for example statistical analyses or analyses using artificial intelligence methods, and obtaining comparable results between the initial data set and the avatars.

Preserving the structure of the initial data, in other words their granularity, is possible, whereas the known solutions using aggregation or generalization offer good security but lose in terms of signal retention. For example, the method according to the invention allows continuous values to be preserved for age 30, 32 or 35 years, rather than a single 30-35 year category.

The invention facilitates data access and offers a complete solution, making the method accessible to people who are not experts. This allows the user to save time by offering a turnkey solution rather than a tool that requires the intervention of a data scientist, a legal expert and a data sharing solution provider.

Initial Data and Number k of Nearest Neighbors

According to the CNIL definition, "item of sensitive data" should be understood as information concerning racial or ethnic origin, political, philosophical or religious opinions, trade union membership, health or sexual life. Sensitive data include personal data, in particular health data.

The initial data set, also known as "microdata," comprises attributes relating to a plurality of individuals. Said data are for example records containing information on patients presenting at an emergency unit or using a healthcare entity, or forming part of a research cohort for a given disease, a clinical trial, or various items of information relating to residents of a municipality, or profiles of users of a given service.

The initial data set may be downloaded by interfacing with a database of the computer system on which the method according to the invention is implemented, or with a database of a remote computer system.

The initial data may include at least one attribute having a numeric value, known as a continuous variable, and/or at least one attribute belonging to a class representing a characteristic of the individual, known as a categorical variable or class attribute.

The logical constraints linked to the nature of the attributes may be specified by the user.

A multivariate analysis is advantageously carried out on the initial data, prior to identifying the k nearest neighbors of the individual, in a particular principal component analysis (PCA). This mathematical method allows the dimensionality of a data set to be reduced by identifying the most important axes of variances, discrimination and informativeness, and showing the essence of a data set with N dimensions in a more limited number of dimensions while respecting user-defined parameters, in particular by allocating a weight to each variable.

The values of the attributes thus modified may then be projected in the same geometrical space.

Multivariate analysis, in particular a principal component analysis, may be carried out on categorical and continuous attributes.

Each attribute may also be defined as more or less sensitive. The user can therefore choose to perturb the data set more profoundly for some attributes in particular. In a multivariate analysis, different weights may be allocated to each attribute, which modifies the data projection used to identify the nearest neighbors.

For example, if a significant weight has been allocated to the "size" attribute, this has the effect of exacerbating and distorting the projection in the Euclidean space. Thus, the distances between the points are particularly affected by the "size" attribute compared with other attributes: small differences in size have more significant effects on the projection and the patient environment.

Nearest Neighbors

The number k of nearest neighbors may be a function of the initial data for the individual considered. The number k of nearest neighbors may be variable, being different for some individuals, or from one individual to another, for the same initial data set.

This parameter may be chosen according to a sensitivity factor of the initial data and/or a confidence factor in the intended recipient of the avatar data: the higher the sensitivity factor and/or the lower the confidence factor, the higher the number k, and the lower the sensitivity factor and/or the higher the confidence factor, the lower the number k.

The sensitivity factor and the confidence factor may be between 0 and 1.

The choice of the number k of nearest neighbors depends on the desired balance between protecting the initial data and retaining the signal. The initial data sets may have variable degrees of sensitivity, in other words the consequences of their being known are different. For example, in the case of medical data, knowing the body mass index of a person may be less damaging than knowing if that person is suffering from cancer.

It is also important to estimate the confidence the user places in the recipient of the avatar data. For example, for an exchange of data within the same hospital, this level of confidence is greater than if the data are intended to be put online publicly.

The invention is based on producing local modeling from the nearest neighbors for each record corresponding to an individual. For medical data, for example, this consists of identifying, for each patient, the k patients that resemble him or her. The processing applied is therefore carried out according to a neighborhood that is unique to each individual. The invention is therefore centered on individuals and not on a set of individuals that resemble each other, and is therefore differentiated from the known methods which are based on group observations.

Avatar Data

Where the initial data comprise at least one attribute that has a numeric value, the new attribute value corresponds preferably to a stochastically weighted barycenter calculated from the values of that same attribute for the k nearest neighbors, each weighted by a coefficient chosen randomly from a uniform or exponential distribution.

A different coefficient may be chosen randomly for each value of the attribute for each of the k nearest neighbors.

If the attributes are projected in the same Euclidean space, for any point M advantageously G exists, the weighted stochastic weighting barycenter of the polygon with k vertices, corresponding to the k nearest neighbors:

$$\sum_{i=1}^{k} \alpha_i \overrightarrow{MA_i} = \left(\sum_{i=1}^{k} \alpha_i\right) \overrightarrow{MG}$$ [Math 1]

$\alpha_i$: random weighting coefficient
$A_i$: vertex of polygon (neighbor),
such that $$\sum_{i=1}^{k} \alpha_i \overrightarrow{GA_i} = \vec{0}.$$ [Math 2]

The stochastically weighted barycenter G is advantageously calculated in a number N of dimensions corresponding to the number of attributes that have a numeric value.

The method according to the invention allows marginal records to be more substantially re-centered to eliminate the risk of re-identification, due partly to the fact that calculating the new attribute value does not use the original value directly but only its neighborhood to produce a local generalization.

If the initial data comprise at least one attribute belonging to a class representing a characteristic of the individual, the new attribute value is advantageously chosen randomly according to the weighted representation of said class among the k nearest neighbors, calculated according to the number of values belonging to said class in the k nearest neighbors, weighted by the number of values belonging to said class in the entire initial data set.

For example, for an attribute indicating whether a patient is pregnant or not, the proportions of the "pregnant" or "not pregnant" classes are calculated within the k nearest neighbors, then weighted by the representation of those same classes in the entire data set. The new attribute value is then drawn randomly according to this weighted representation.

This approach allows the stochasticity of random drawing which ensures re-identification difficulty to be combined with the assurance that said drawing is biased by the representativeness of each class among the nearest neighbors.

A uniform, lognormal or exponential distribution may be used for calculating random weighting coefficients for the numeric attributes and the random choice of new class attribute values.

The new numeric and class attribute values are advantageously generated together to create the avatar data. The invention, which culminates in the creation of avatar data, is advantageously a vector transformation of the initial data for the individual.

The data set is therefore advantageously reconstituted from the continuous and categorical variables. The invention ensures the preservation of the original attribute types. For example, if age is an attribute taking integer values in the initial data set, this will have the same form after the avatars are created. This result differs from known generalization methods where a plurality of patients of similar ages are present in the same age class after the data are anonymized, locking in an information loss.

At least one constraint function may be applied to the avatar data in order to limit aberrant values or a change in the relationship between attributes relating to the same individual, in particular to restrict the distributions of numerical attributes or to respect a logical relationship between class attributes. The minimum and maximum of an initial numerical attribute may be used, if necessary, to modify the resulting avatar attribute, in particular to ensure that an age lower than the minimum age of the initial data set does not appear. A constraint function, based on logical relationship rules between the different, previously established attributes, may be applied, such as the fact that a man cannot be pregnant. This further increases the resemblance between the initial data set and the avatar data, and allows data coherence to be preserved.

The data set made up of avatars advantageously has the same dimension as the initial data set.

The processing applied to the initial data set remains valid on the avatar data.

Recording and Accessing the Avatar Data

The avatar data are advantageously recorded in a database in the same computer system and/or in that of a remote server.

The avatar data set may be recorded in file form on a local workstation, for example for internal use. In a variant or in combination, the avatar data set may be recorded on a remote server, in particular by uploading via a transmission channel, such as the Internet or an intranet.

Restricted access may be created for recipients of the avatar data. Said recipients may be advised that said data have been made available by a hybrid authentication system comprising at least two steps, based in particular on generating and transmitting a unique download link, for example by email, then communicating a limited-life key, for example by text message. The user may also decide to restrict access to particular attributes or individuals, or to set up a maximum number of enquiries the recipient may make.

The recipients may access the avatar data in different ways, such as downloading the avatar file, for example in CSV, XML or XLS format, directly from a unique personalized link, browsing and downloading the file using a secure protocol such as SFTP, a secure enquiry on a database on a remote server, or an application programming interface (API) that allows the recipient to interface one of his or her applications directly with the data.

In the last case, the user is advantageously in a position to supply a version of the avatar data set that has been updated in real time. This is particularly useful in a context where access to sensitive data may be revoked, for example after putting in place the General Data Protection Regulation (GDPR), or if the number of records in a cohort does not cease to increase, for example in the case of patients recruited to a current medical research study.

A report containing details of the avatar data creation may be generated automatically, comprising in particular the parameters of the multivariate analysis used, the number of individuals and numeric and class attributes, and the number k of nearest neighbors. This report allows the operations carried out to be traced, and is useful for archiving or legal requirements. Clearly the report does not contain any information that allows the initial data to be recovered. Note that the report in no circumstances allows the avatarization operations carried out to be reversed, as said report preserves no trace of the randomly generated values inherent to the operation of the method.

All the steps of the invention are advantageously implemented automatically by a computer.

Computer Program Product

Another object of the invention, according to another aspect thereof, is a computer program product for implementing the method according to the invention to create avatars from an initial sensitive data set stored in a database of a computer system, said initial data containing attributes relating to a plurality of individuals, the computer program product comprising a support and instructions recorded on said support that can be read by a processor in order, when executed, to:
  a) choose, for attributes relating to a given individual, a number k of nearest neighbors to be used from all the individuals in the initial data set,
  b) identify, for said individual, the k nearest neighbors from among the other individuals in the initial data set,
  c) generate, for at least one attribute relating to said individual, a new attribute value from quantities which are characteristic of said attribute in the identified k nearest neighbors and weighted by a coefficient, and
  d) create avatar data comprising the new attribute value(s), so as to ensure the sensitive data relating to the individual are non-identifiable.

The characteristics set out above for the method apply to the computer program product, and vice versa.

Avatar Creation Device

Another object of the invention, according to a further aspect thereof, is a device for creating avatars from an initial sensitive data set stored in a database of a computer system, said initial data comprising attributes relating to a plurality of individuals, the device comprising:
  a) a choice module configured to choose, for attributes relating to a given individual, a number k of nearest neighbors to be used from all the individuals in the initial data set,
  b) an identification module configured to identify, for said individual, the k nearest neighbors from among the other individuals in the data set,
  c) a generation module configured to generate, for at least one attribute relating to said individual, a new attribute value from quantities which are characteristic of said attribute in the identified k nearest neighbors and weighted by a coefficient, and
  d) an avatar creation module configured to create avatar data comprising the new attribute value(s), so as to ensure the sensitive data relating to the individual are non-identifiable.

The device according to the invention may also comprise a recording module configured to record the avatar data in a database of the same computer system and/or of a remote server.

The avatar creation device may comprise a module for specifying the logical constraints specific to the data set and linked to the nature of the attributes.

The device may also comprise a module for choosing the number k of nearest neighbors.

The avatar creation device may comprise a module for evaluating the properties of the avatars according to the re-identification risk and the information loss risk.

The avatar creation device may comprise an advice module configured to advise the recipients of the avatar data that said data have been made available by a hybrid authentication system comprising at least two steps, based in particular on generating and transmitting a unique downloading link, for example by email, then communicating a limited-life key, for example by text message.

The characteristics set out above for the method and the computer program product apply to the device, and vice versa.

BRIEF DESCRIPTION OF THE DRAWINGS

The invention may be better understood on reading the detailed description that follows of non-limiting examples of the implementation thereof, and on examining the accompanying drawings in which.

DETAILED DESCRIPTION

Figure 1:
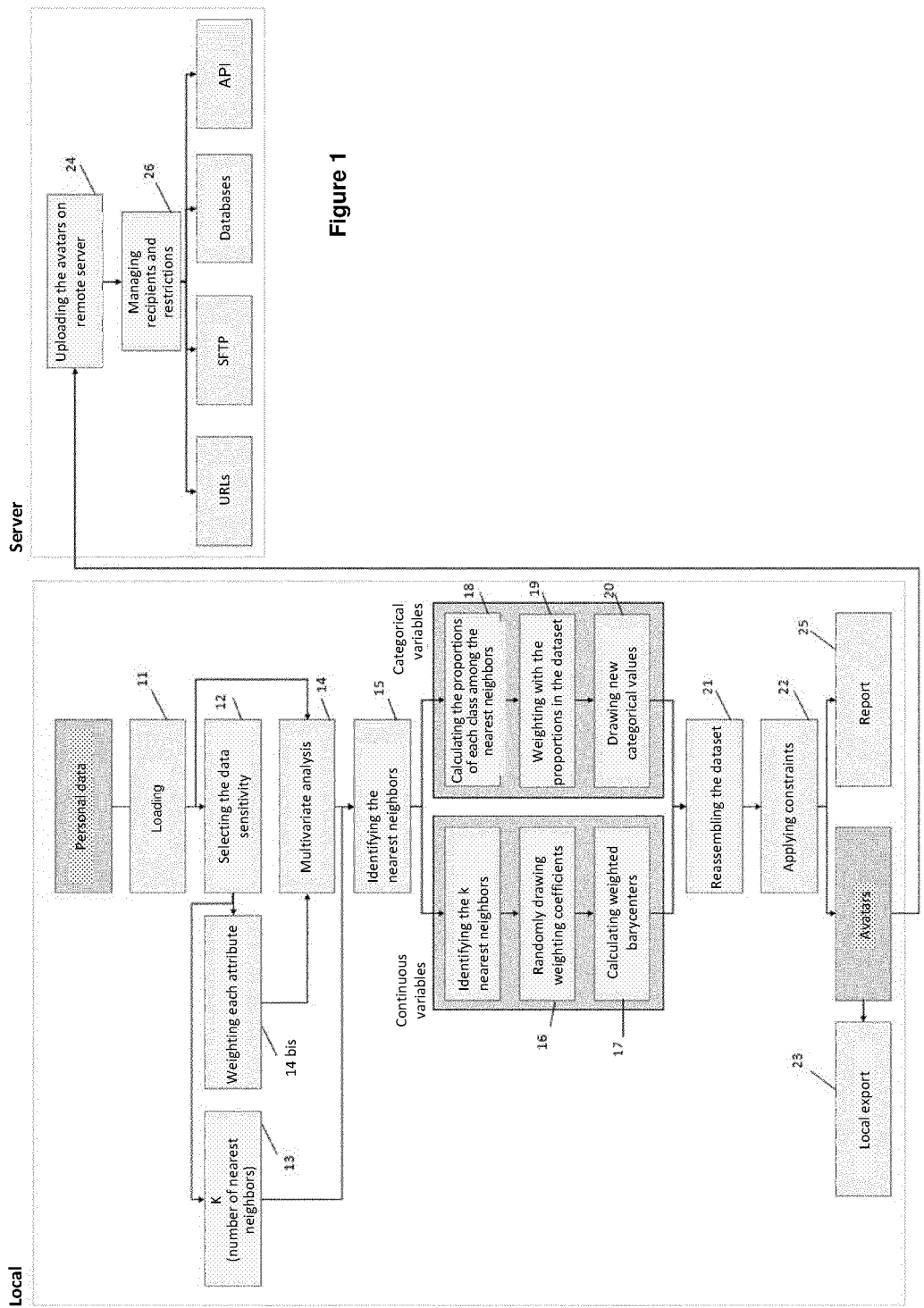
FIG. 1 shows the steps for creating avatar data from initial sensitive data according to the invention.

FIG. 1 shows an example of the steps for creating avatar data from initial sensitive data according to the invention.

In this example, an initial data set is downloaded in step 11 by interfacing with a database of a computer system on which the method according to the invention is implemented, or with a database of a remote computer system. This initial data set comprises attributes relating to a plurality of individuals, which may be numeric attributes and/or attributes belonging to a class representing a characteristic of the individual. The logical constraints linked to the nature of the attributes may be specified by the user.

In step 12, as described above, sensitiveness factors and confidence factors are established in order to choose, in step 13, the number k of nearest neighbors. The number k of nearest neighbors may be chosen independently for each individual item of sensitive data, and may therefore also be determined locally, and may vary from one individual to the next for the same data set.

In step 14, a multivariate analysis is carried out on the initial data, in particular a principal component analysis, allocating a weight to each attribute in step 14 bis. The k nearest neighbors of the individual are therefore identified from the modified data, in step 15. For example, if a weight of 0.1 is allocated to age, a weight of 0.2 to BMI and a weight of 0.75 to the number of pregnancies, it is thus specified that the last attribute is particularly sensitive, which will distort the projection of the data in the multivariate analysis.

For a numeric attribute, in step 16 a coefficient is chosen randomly for each value of the attribute for each of the k nearest neighbors in order to calculate, in step 17, a stochastic weighted barycenter G from the values of that same attribute for the k nearest neighbors, each value weighted by this random coefficient to obtain the new values for the item of avatar data. If the data contain N numeric attributes, the stochastic weighted barycenter G is calculated in N dimensions, thus giving all the new values for the attributes considered.

For an attribute that belongs to a class representing a characteristic of the individual, in step 18, the number of attributes belonging to said class in the k nearest neighbors is calculated, then this number, in step 19, is weighted by the number of individuals belonging to this class in the entire initial data set, in order to randomly choose, in step 20, the new attribute value according to this weighted representation.

In step 21, the new numeric and class attribute values are generated together to create the avatar data so as to make the sensitive data relating to the individual non-identifiable.

In step 22, the constraints as defined by the user are applied to the avatar data in order to limit aberrant values or a change in the relationship between attributes relating to the same individual, as described previously.

The method according to the invention is repeated for each individual. The method is centered on an individual sensitive observation. Said method allows as many avatars as are required to be generated for individuals whose data are sensitive, as do known simulation methods that use global modeling or re-sampling.

The avatar data thus created may be recorded in a database of the same computer system in step 23, and/or in that of a remote server in step 24.

The recipients of the avatar data are managed in step 26. The data may be made available by different means, such as downloading the avatar file, for example in CSV, XML or XLS format, directly from a unique personalized link, browsing and downloading the file using a secure protocol such as SFTP, a secure enquiry on a database on a remote server, or an application programming interface (API) allowing the recipient to interface one of his or her applications directly with the data.

Recipients may be advised that data have been made available by a hybrid authentication system comprising at least two steps, based in particular on generating and transmitting a unique download link, for example by email, then communicating a limited-life key, for example by text message.

A report containing details of the creation of the avatar data may be generated automatically in step 25, said report comprising for example the parameters of the multivariate analysis used, the number of individuals and numeric and class attributes, and the number k of nearest neighbors.

Figure 2:
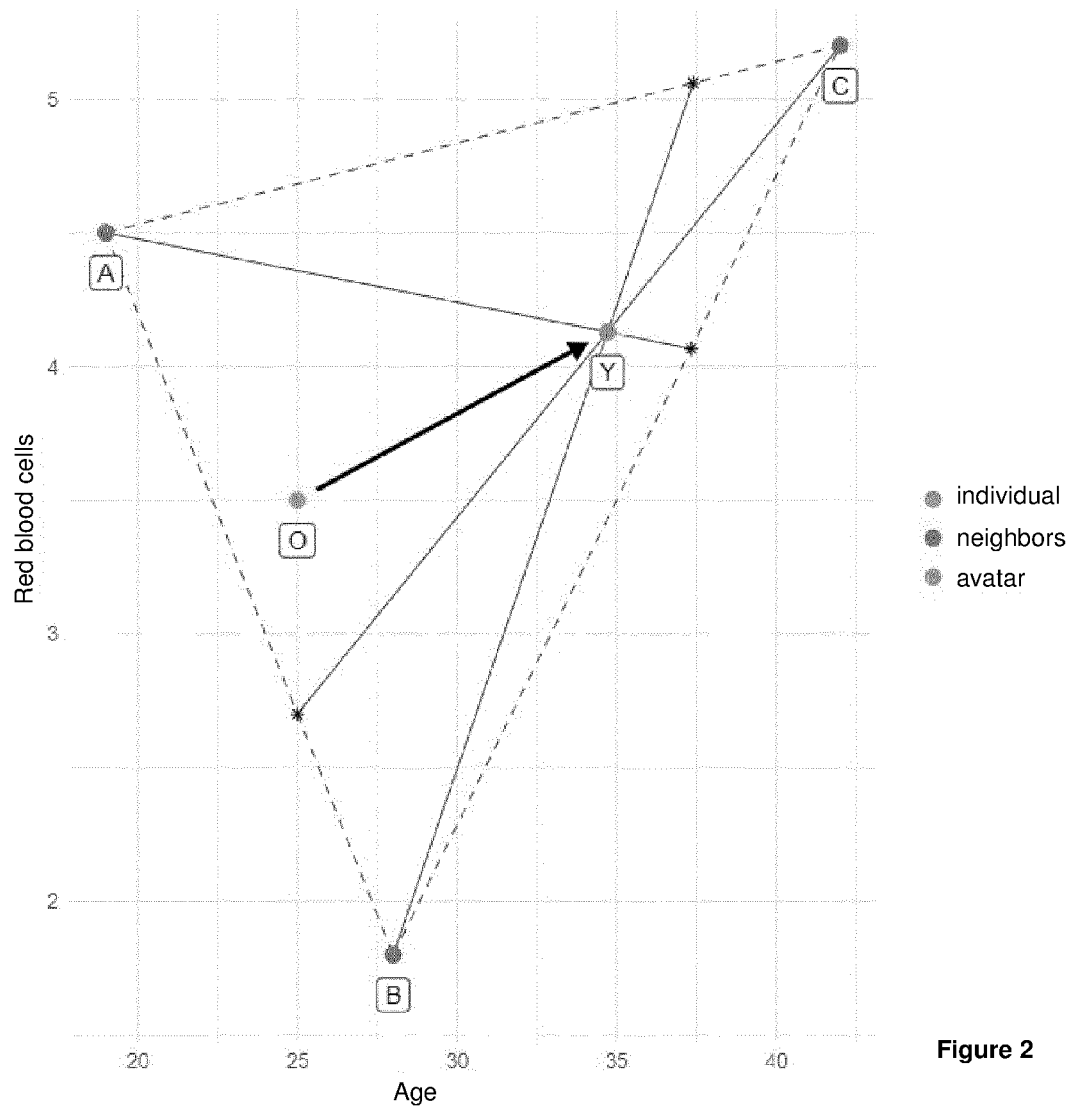
FIG. 2 is an example of creating avatar data for an original numeric attribute.

FIG. 2 shows an example of an avatar created from initial data comprising quantitative attributes (age and level of red blood cells, which can be seen in Table 1 below). This example is produced from raw data in the interests of simplicity, but avatars are advantageously created after multivariate analysis, in particular a principal component analysis.

TABLE 1

| Individual | Age | Red blood cells (M/µl) |
|---|---|---|
| O | 25 | 3.5 |
| A | 19 | 4.5 |
| B | 28 | 1.8 |
| C | 42 | 5.2 |

As can be seen in FIG. 2, the attribute values for each individual are projected into the same Euclidian space. In this example, an avatar Y is created for individual O using three of his or her neighbors, i.e. k=3. The nearest neighbors of individual O are identified. A coefficient is drawn randomly for each neighbor. The coordinates of each neighbor with the associated coefficients are used to calculate the stochastically weighted barycenter and form the avatar data. In the example considered, the avatar Y of individual O has 34, 47 as the attribute value for his or her age, and 4, 13 M/µl as the red blood cells attribute.

Figure 3:
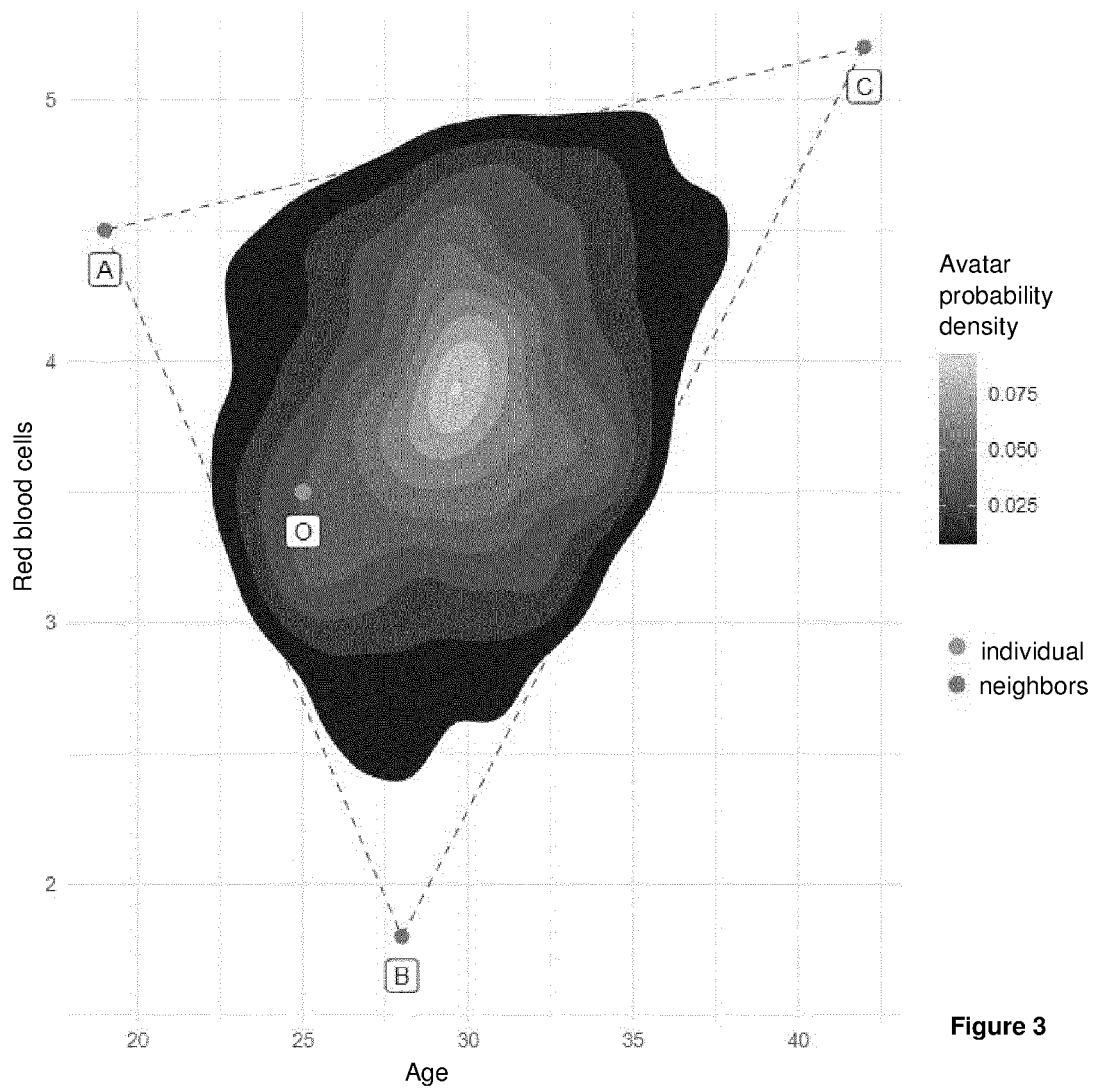
FIG. 3 shows the probability density distribution of the avatar attribute values relative to the nearest neighbors for the example in FIG. 2.

FIG. 3 shows the probability density distribution of the avatar attribute values relative to the nearest neighbors of the previous example. As the method according to the invention is partly random, if a large number of avatars is created for the same individual, those avatars are distributed in the space between the k nearest neighbors according to a probability density, as can be seen in FIG. 3.

EXAMPLE

An example of the implementation and effectiveness of the invention will now be described. In this example, the data set concerns real patients and originates from the open access database "Pima Indians Diabetes Database," which comprises 768 individuals, eight continuous variables (number of times pregnant, blood glucose level, blood pressure, skin thickness, blood insulin level, age, body mass index and diabetes pedigree function), and a categorical variable (suffers from diabetes or not).

Principal component analysis is carried out on the data in order to project the data set in nine dimensions, corresponding to the nine attributes, for example in a three-dimensional space when the data are to be displayed. The method according to the invention, as described above, is applied to all the data. The number k of nearest neighbors is set at 50.

Figure 4:
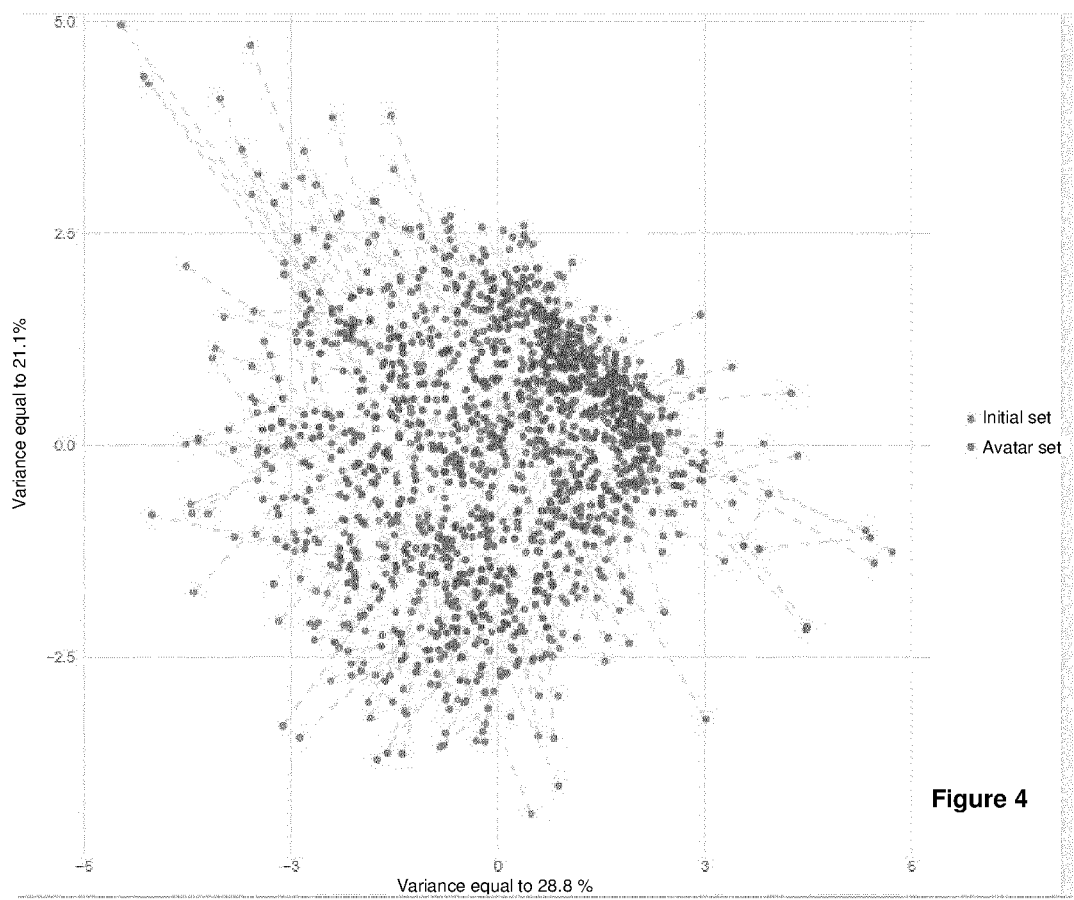
FIG. 4 shows the position in space of the avatar data and the initial data.

The illustration in FIG. 4 shows that, for k=50 nearest neighbors considered, the method according to the invention allows avatar data to be achieved that evolve in the same space as the initial data and therefore supposes good preservation of the properties of the original data set. By definition, a marginal record, in other words an individual who has somewhat uncommon values, is more sensitive to re-identification. Using the invention, as can be seen in FIG. 4, marginal records are partly demarginalized and systematically brought closer to other records. A commonplace record, on the other hand, generates an avatar that is close to numerous other records that are similar thereto. The avatar produced is distinguished from the original record by its multiple proximities to other individual records.

Figure 5:
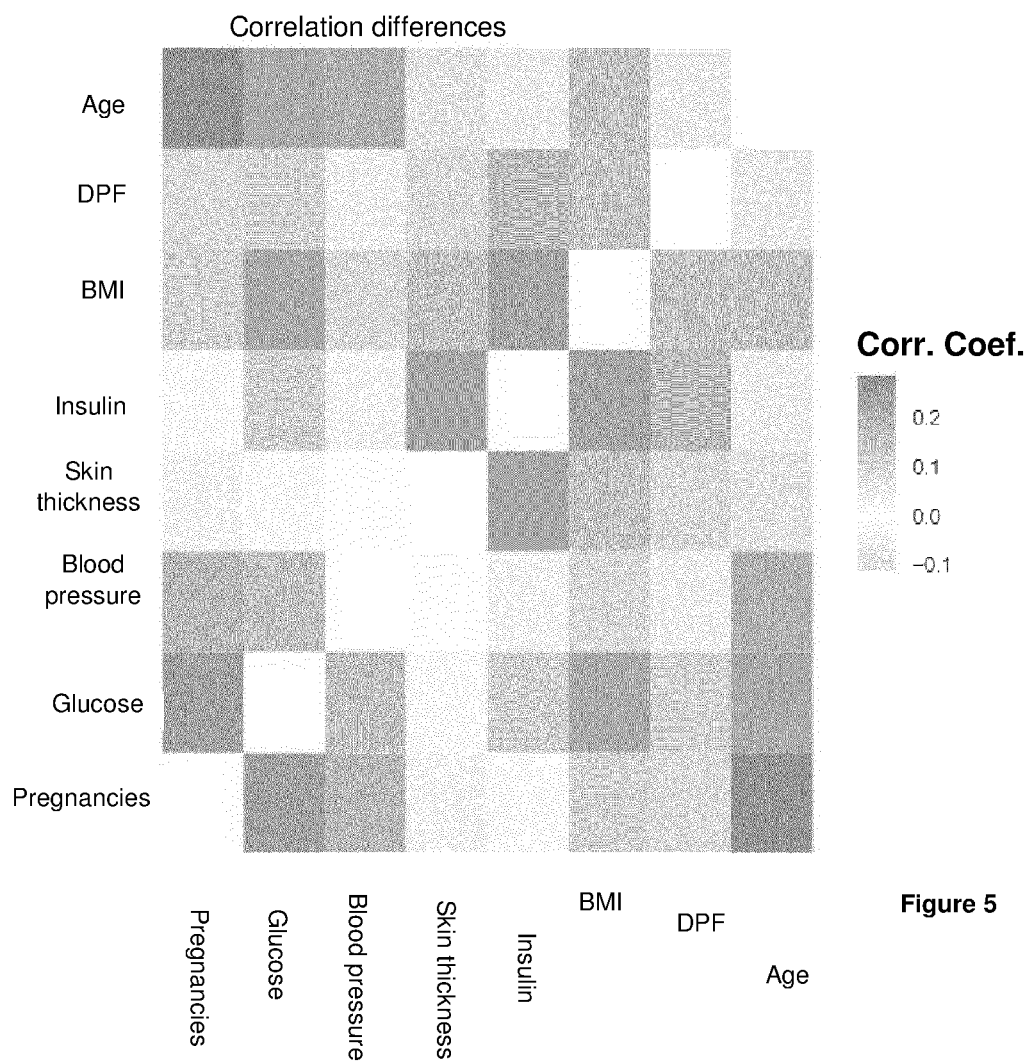
FIG. 5 shows the correlation difference between different attributes of an initial data set and an avatar data set.

A data set that is of statistical interest is made up of variables that have relationships to each other. The effect of creating avatars on these relationships is evaluated by calculating the correlation difference between the attributes of the initial data set and those of the avatar data. FIG. 5 shows that the correlation difference, for k=50, is modest and fairly balanced: the method according to the invention has not changed the relationship between the attributes too significantly. These two analyses allow the overall effects of the invention on the data to be assessed. The analysis may be broken down locally to assess the local effects of the invention on data sub-groups.

Preservation of the signal may also be validated at a first level by carrying out the same analysis on the initial data set and on the avatar data: establishing a diabetes predictive model using the eight other attributes of the data set. To do this, a predictive algorithm, for example a random forest algorithm, is trained on 80% of the avatar data set and on 80% of the initial data set. The performance of the two models is then evaluated using the remaining 20% of the original data set by measuring the sensitivity and specificity thereof. In the example relating to the diabetes data set, the values obtained for these two measures are very close: 0.575 sensitivity for the initial data against 0.553 for the avatar data, and 0.868 specificity for the initial data against 0.89 for the avatar data.

A model trained with avatars therefore allows the occurrence of diabetes to be predicted with comparable performance to that of a model trained on the original data. The classification performance of the predictive algorithm is comparable and validates the usefulness of avatars for analyses, for example statistical analyses or using automatic learning. The preservation of the original properties therefore allows the same processing and analysis to be applied to the avatar data as those carried out on the initial data set.

In an example of an attack scenario, an attacker wishes to know if an individual, for whom said attacker knows some information, has chosen to participate in a scientific study on diabetes. To do this, in an unfavorable study case for the invention, said attacker has full initial data comprising all the sensitive data relating to this individual, and an avatar data set.

This case is a very extreme example where the only information the attacker does not have is whether or not the patient is present in the cohort. The prerequisite of knowing the full original record for the patient is particularly ambitious, but it allows the most unfavorable situation to be analyzed. However, in the vast majority of cases, the attacker only has some information on the patient, in other words only a few attributes, and is seeking to collect new information on the patient.

Figure 6:
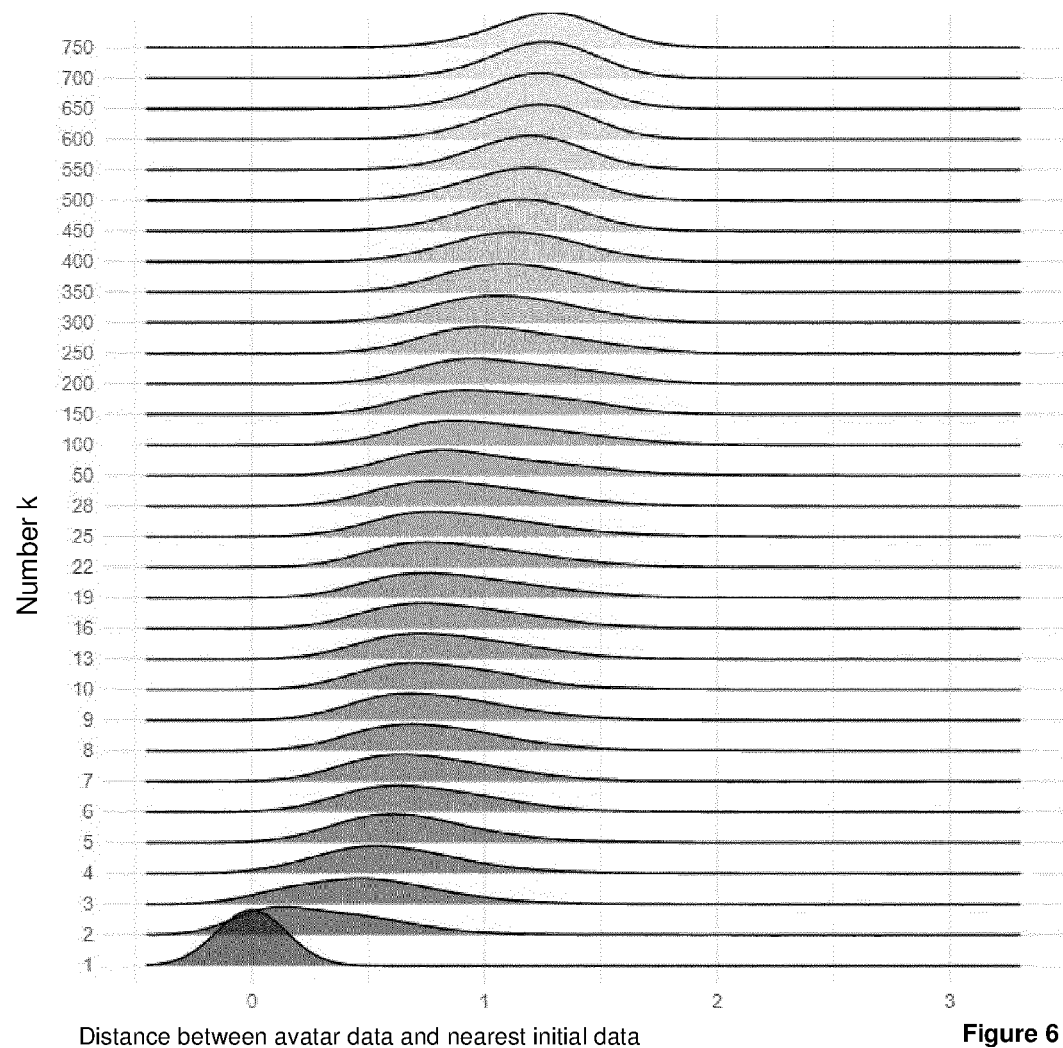
FIG. 6 shows the change in the distance between an avatar created according to the invention and the original nearest individual, according to the number k of nearest neighbors.

FIG. 6 shows the evolution in the distance between an avatar and the nearest original record, depending on the number k of nearest neighbors. This distance allows the re-identification risk in the context of attacks by proximity to be assessed, in which attacks the object is to establish the link between the avatar data and the initial data, which in this scenario the attacker possesses.

Figure 7:
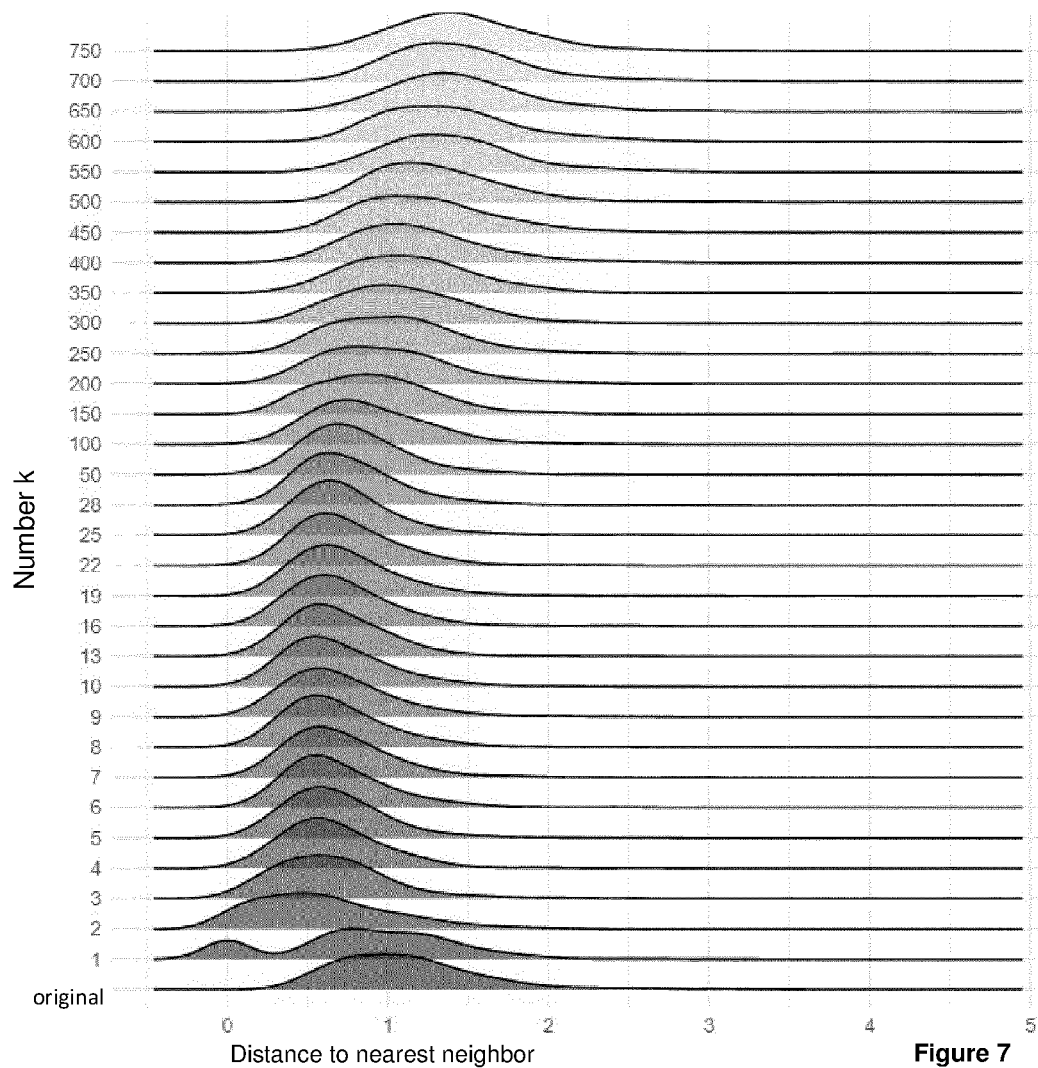
FIG. 7 shows the change in the distances between the nearest neighbor and an individual in an initial data set according to the number k of nearest neighbors.

FIG. 7 shows the evolution in the distances between the nearest neighbor and an individual in the initial data set according to the number k of nearest neighbors. The distance between the nearest neighbors is important to assess the density of a data set. By comparing this figure with the previous figure, it can be seen that for k equal to 50, the density distribution of the avatar data set is comparable to that obtained for the original data set.

Of course, the invention is not limited to the examples that have just been described. In particular, other multivariate analysis methods or random drawing methods may be used, as may other means of downloading and uploading the data. These two examples highlight the primacy of re-identification risk over signal preservation in the invention, which differentiates said invention from other known data simulation methods.

Applications of the Invention

The invention may be used in data sharing applications for analysis. Avatarization opens up the possibility of making use of sensitive data in their individual granularity, not limited to sensitive data, for internal and external stakeholders. The object of sharing these data is to use the information potential contained in the data sets for both retrospective interests and predictive requirements. Artificial intelligence techniques should not be forced to choose between sensitive data liberalization to the detriment of protecting individuals, and the collective benefits to be drawn therefrom.

A public health organization, such as a hospital, has a database with high-value information. This information is an issue in medical research as sharing is made difficult by legitimate regulatory constraints. By creating avatars, the invention allows the quality of the data to be preserved while respecting the confidentiality of the patient data. Health data, the sharing of which will improve decision-making, practices and research, may therefore be offered a second life. A collection of data on patients affected by a particular pathology may be used by a doctor to guide and assist his decision, for example to choose between different treatments depending on the age and lifestyle of the patient. A public health organization could also create avatars from its data to predict what is needed to improve its work and alert the public authorities early to undertake an awareness-raising campaign and plan the necessary resources, for example in the case of an epidemic.

Furthermore, a municipality could create avatars from the data for its territory and entrust said avatars to a service provider to detect the areas or populations that need special attention. Avatars allow data with potential to be used, which in this case would be an effective way to help prevent social division and provide access to healthcare. This could also allow preventive actions to be targeted effectively and even allow a policy in support of equality in healthcare using prediction to be put in place, in particular through the use of artificial intelligence techniques.

It is possible to envisage, for example, the planning of vaccination campaigns. A municipality could also use the health information of its population to plan and develop a policy to expand green spaces, thus favoring places that really need those spaces, or to adapt its alternate-day travel policy as part of anti-pollution measures.

A subscription service company streaming films and TV series could publish avatars of its customers as open data to allow film and series producers to focus on customer profiles and thus refine their offer.

The prospect of sharing data could be envisaged internally or externally to improve access to data.

The invention may also be used to help calculate risk scores on customer profiles with a degree of accuracy never yet achieved, in particular by insurance companies or complementary insurance schemes. This vision may be brought into sharper focus by the possibility of database cross-checking using avatars, thus enhancing the lessons that can be learned.

Data set democratization is an opportunity for teaching and pedagogical quality, improving the prospects of pedagogical approaches. Access to data sets in the form of avatars allows data access to be enjoyed more widely, without having to pass through complex, and ultimately limiting, regulatory steps. Students could be trained on avatar data sets from real cohorts with the statistical properties preserved.

The invention may be used in for-profit data sharing applications, for example when providing a paid-for service. A pharmaceutical company focusing on a pathology could use patient avatar data to improve drug development.

Large-scale retail distribution could make use of checkout receipt data, including consumer habits, frequency and time of day, for example, to establish consumer pathways that could be used by suppliers.

Data sharing may take place in the context of improving the management and internal strategy of an enterprise. Companies and organizations are obliged to protect client privacy. Paying attention to privacy is a guarantee that a company is trustworthy: it affects reputation and image, and therefore long-term customer loyalty. To limit the impact of a possible IT failure, a company could use an avatar database that has been generated according to the invention in production, and keep the original sensitive data in complete security.

The invention may be used in data sharing applications for application development. To develop, upgrade or maintain applications, a sufficient amount of data is required. It is also crucial that the test data should have identical structures to the actual data; for example, to allow a new bank payment application to be developed on a bank website, the provider needs data sets that reflect real data. However, whether these are service providers or dedicated internal departments, it is vital that the data used for this purpose are not sensitive data. The avatars according to the invention fulfill this role.

By creating avatars, the invention allows the information potential contained in sensitive data to be preserved without having to delete data (to comply with the GDPR). It is in the interest of companies to preserve the statistical information contained in data sets, which represent a strategic interest. A highway management company could keep avatars of automobile driver data with no time limit.

It is also possible to envisage avatars playing a role in governance procedures, where said avatars could alleviate constraints. It would be possible to imagine pragmatic governance of data use where concept proof partly on an avatar data set would be an integral part of authorizing access to the original data and the deployment of algorithms.

The invention claimed is:

1. Method for creating avatars from an initial sensitive data set stored in a database of a computer system, said initial data comprising attributes relating to a plurality of individuals, the method comprising:
   a) choosing, for attributes relating to a given individual, a number (k) of nearest neighbors to be used from all the individuals in the initial data set,
   b) identifying, for that individual, the k nearest neighbors from among the other individuals in the data set,
   c) generating, for at least one attribute relating to said individual, a new attribute value from quantities which are characteristic of said attribute in the identified k nearest neighbors and weighted by a coefficient, and
   d) creating avatar data comprising the new attribute value(s), so as to ensure the sensitive data relating to the individual are non-identifiable.

2. Method according to claim 1, wherein the number (k) of nearest neighbors is chosen according to a sensitivity factor of the initial data and/or a confidence factor in the intended recipient of the avatar data, the higher the sensitivity factor and/or the lower the confidence factor, the higher the number of nearest neighbors, and the lower the sensitivity factor and/or the higher the confidence factor, the lower the number of nearest neighbors.

3. Method according to claim 1, wherein a multivariate analysis, in particular a principal component analysis, is carried out on the initial data, prior to identifying the k nearest neighbors of the individual, the attribute values thus modified being then in particular projected in the same Euclidean space.

4. Method according to claim 1, wherein, the initial data comprising at least one attribute that has a numeric value, the new attribute value corresponds to a stochastically weighted barycenter (G) calculated from the values of that same attribute for the k nearest neighbors, each weighted by a randomly chosen coefficient.

5. Method according to claim 4, wherein a different coefficient is chosen randomly for each value of the attribute of each of the k nearest neighbors.

6. Method according to claim 4, wherein the stochastically weighted barycenter (G) is calculated in a number (N) of dimensions corresponding to the number of attributes that have a numeric value.

7. Method according to claim 1, wherein, the initial data comprising at least one attribute belonging to a class representing a characteristic of the individual, the new attribute value is chosen randomly according to the weighted representation of said class among the k nearest neighbors, calculated according to the number of values belonging to said class in the k nearest neighbors, weighted by the number of values belonging to said class in the entire initial data set.

8. Method according to claim 1, wherein the number (k) of nearest neighbors is variable, being different for some individuals, or from one individual to another, for the same initial data set.

9. Method according to claim 1, wherein at least one constraint function is applied to the avatar data in order to limit aberrant values or a change in the relationship between attributes relating to the same individual, in particular to restrict the distributions of numerical attributes or to respect a logical relationship between class attributes.

10. Method according to claim 1, wherein the avatar data are recorded in a database of the same computer system and/or of a remote server.

11. Method according to claim 1, wherein the recipients of the avatar data are advised that said data have been made available by a hybrid authentication system comprising at least two steps, based in particular on generating and transmitting a unique download link, including by email, then the communicating a limited-life key, for including by text message.

12. Device for creating avatars from an initial sensitive data set stored in a database of a computer system, said initial data comprising attributes relating to a plurality of individuals, the device comprising:
   a) a choice module configured to choose, for attributes relating to a given individual, a number (k) of nearest neighbors to be used from all the individuals in the initial data set,
   b) an identification module configured to identify, for said individual, the k nearest neighbors from among the other individuals in the data set, c) a generation module configured to generate, for at least one attribute relating to said individual, a new attribute value from quantities which are characteristic of said attribute in the identified k nearest neighbors and weighted by a coefficient, and d) an avatar creation module configured to create avatar data comprising the new attribute value(s), so as to ensure the sensitive data relating to the individual are non-identifiable.

13. Device according to claim 12, which also comprises a recording module configured to record the avatar data in a database of the same computer system and/or of a remote server.

14. Device according to claim 12, comprising an advice module configured to advise the recipients of the avatar data that said data have been made available by a hybrid authentication system comprising at least two steps, based in particular on generating and transmitting a unique downloading link, including by email, then communicating a limited-life key, including by text message.

15. Computer program product for implementing the method for creating avatars from an initial sensitive data set stored in a database of a computer system, according to claim 1, said initial data containing attributes relating to a plurality of individuals, the computer program product comprising a support and instructions recorded on said support that can be read by a processor in order, when executed, to:

a) choose, for attributes relating to a given individual, a number (k) of nearest neighbors to be used from all the individuals in the initial data set, b) identify, for said individual, the k nearest neighbors from among the other individuals in the initial data set, c) generate, for at least one attribute relating to said individual, a new attribute value from quantities which are characteristic of said attribute in the identified k nearest neighbors and weighted by a coefficient, and d) create avatar data comprising the new attribute value(s), so as to ensure the sensitive data relating to the individual are non-identifiable.

* * * * *